(12) United States Patent
Barlier

(10) Patent No.: US 12,065,284 B2
(45) Date of Patent: Aug. 20, 2024

(54) CONTAINER WITH HINGE

(71) Applicant: KeepCool USA LLC, Orinda, CA (US)

(72) Inventor: Pierre Barlier, Lafayette, CA (US)

(73) Assignee: KEEPCOOL USA LLC, Orinda, CA (US)

( * ) Notice: Subject to any disclaimer, the term of this patent is extended or adjusted under 35 U.S.C. 154(b) by 401 days.

(21) Appl. No.: 16/703,886

(22) Filed: Dec. 5, 2019

(65) Prior Publication Data

US 2020/0122886 A1 Apr. 23, 2020

Related U.S. Application Data

(63) Continuation of application No. PCT/US2019/050888, filed on Sep. 12, 2019.

(60) Provisional application No. 62/730,500, filed on Sep. 12, 2018.

(51) Int. Cl.
| | |
|---|---|
| A45C 13/04 | (2006.01) |
| A45C 13/00 | (2006.01) |
| B65D 21/08 | (2006.01) |
| B65D 33/00 | (2006.01) |

(52) U.S. Cl.
CPC .......... B65D 21/086 (2013.01); A45C 13/005 (2013.01); B65D 33/007 (2013.01)

(58) Field of Classification Search
CPC .... B65D 33/007; B65D 33/02; B65D 21/086; B65D 5/3692; A45C 7/0063; A45C 13/004; A45C 13/005; A45C 13/007

USPC .......... 383/33, 34, 34.1; 229/117.03, 117.04, 229/9.1–9.3; 220/9.2, 9.3, 9.1; 150/120
See application file for complete search history.

(56) References Cited

U.S. PATENT DOCUMENTS

| | | | |
|---|---|---|---|
| 2,166,360 A * | 7/1939 | Lewis | A45C 3/06 150/120 |
| 3,034,551 A | 5/1962 | Klehr | |
| 4,815,866 A * | 3/1989 | Martone | B65B 67/1238 141/390 |
| 5,538,178 A | 7/1996 | Zink et al. | |
| 5,971,187 A | 10/1999 | Clee et al. | |
| 2008/0000901 A1 | 1/2008 | Turvey et al. | |
| 2010/0230407 A1 * | 9/2010 | Savage | B65D 33/30 220/9.4 |
| 2017/0355491 A1 * | 12/2017 | Verma | B65D 33/007 |

FOREIGN PATENT DOCUMENTS

| | | |
|---|---|---|
| EP | 2550891 B1 | 4/2017 |
| FR | 1073581 A | 9/1954 |
| GB | 2527750 A | 1/2016 |
| WO | 2013028982 A2 | 2/2013 |
| WO | 2020056189 A1 | 3/2020 |

* cited by examiner

Primary Examiner — Jes F Pascua
Assistant Examiner — Nina K Attel
(74) Attorney, Agent, or Firm — BUCHALTER, PC; Cecily Anne O'Rgan

(57) ABSTRACT

A hinge is disclosed herein. Exemplary methods and systems for incorporating a hinge into a container to facilitate retention of the container in a given state are provided. A container having a hinge are described herein, wherein the hinge may include a first portion, a second portion, and a retention interface.

4 Claims, 11 Drawing Sheets

CONTAINER WITH HINGE

PRIORITY

The instant application claims priority to U.S. Provisional Patent Application No. 62/730,500, titled "Container With Hinge", filed Sep. 12, 2018, which is incorporated by reference in its entirety herein.

BACKGROUND

The environmental impacts of single use items have cause a shift toward reusable items. A specific occurrence includes the transition away from using thin plastic single use bags to more robust containers, such as bags, boxes, or crates. The thin plastic single use bag was conventionally provided by the selling establishment and used an outside structure to support the bag and maintain an open position for convenient filling. The new alternative is for individuals to bring their own reusable containers that may include a wide variety of configurations. The different configurations of the reusable container does not facilitate a similar universal structure for supporting the reusable bag in an open position for filling. Therefore, the check out process at selling establishments encounter difficult in the filling process that reduces the time and efficiency of the check out process.

In some instances, the container may be sufficiently sturdy or rigid to semi-support its configuration in an open position. Conventional paper bags can support themselves in an open configuration once opened. However, many users or reusable containers want to store or transport the container in a reduced configuration, but expand the reusable container for filling and use as a container. Conventionally, the reduction in size or shape of the container is achieved by folding the container along one or more surfaces. However, the maintained folded shape tends to crease the material and reduce the ability of the container to maintain a self-supporting open configuration when needed. Therefore, when the container is unfolded after an amount of time of be folding in a reduced configuration, the container material may favor the folded state and lose the ability to be structurally sound.

SUMMARY

Aspects of the present disclosure may include a hinge.

Aspects of the present disclosure may include a container.

An exemplary embodiment includes a container having one or more hinges. The container may include an opening permitting access to an interior space of the container. The container may be collapsible or flexible to permit the container to be maintained in a reduced configuration of reduced volume and/or dimension and a use configuration having an increased volume and/or dimension as compared to the reduced configuration for permitting access to the interior of the container. The container may be configured to remain stable in either or both of the reduced or use configuration. For example, the container may be configured to remain in the use, or open, configuration or the reduced, or closed, configuration. The container may be configured to remain stable in more than one configuration. A configuration is considered stable if the container generally retains its shape or position once positioned in the configuration for a certain duration of time or until an outside force acts on the container to change its configuration.

DRAWINGS

For a more complete understanding of the present disclosure, reference is now made to the following description taken in conjunction with the accompanying drawings.

DESCRIPTION

Figure 1A:
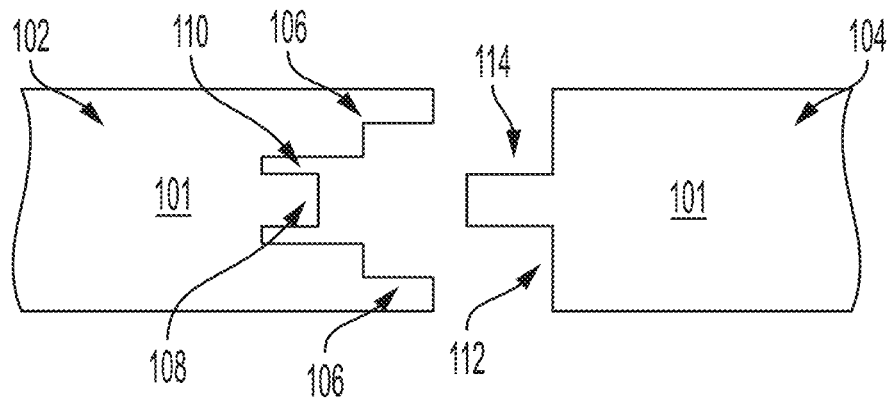
FIGS. 1A-1C illustrate an exemplary embodiment of a cut away of a hinge according to embodiments described herein.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further purposes and advantages, will be better understood from the following description when considered in connection with the accompanying figures. It is to be expressly understood, however, that each of the figures is provided for the purposes of illustration and description only and is not intended as a definition of the limits of the present disclosure.

Exemplary embodiments described herein include a container having a hinge. The container may be altered between one or more configurations. For example, the container may be collapsible and/or expandable. The container may include an opening and may be openable and/or closable. Exemplary embodiments may be configured such that the hinge permits the transition between the one or more configuration. For example, the container may include a flexible portion such as a crease or fold that permits a first portion of the container to rotate, translate, or otherwise move relative to another portion of the container. A hinge may be positioned across the flexible portion of the container. The configuration of the flexible portion and the position of the hinge may permit rotation of the hinge to approximately align with movement of the flexible portion. For example, the axis of rotation of the hinge may align, approximate, or be parallel to the axis of rotation of the fold or crease of the container, which may permit the container to fold along the crease in a closed configuration and expand in an unfolded, or open, configuration. The open configuration may permit the hinge to be approximately linear along its length. The approximation may permit some deviation such as beyond linear or not quite linear but includes expansion of the hinge such that the opening of the container provides easier access from the closed configuration as would be appreciated by a person of skill in the art.

The hinge may include different configurations. Exemplary embodiments of a hinge are provided herein for sake of illustration. The hinge may include a hinge body having a first portion and a second portion. The first and second portions may be generally elongate extensions from an attachment point between the first and second portions. The attachment point may permit the relative movement of the first portion relative to the second portion. The relative movement may be a rotational movement. The first portion may therefore be permitted to move relative to the second portion from a first configuration to a second configuration. The first configuration may include the first portion and second portion approximately parallel to each other and/or positioned adjacent each other along their length, extending in the same general direction from the attachment point. The second configuration may include the first portion and second portion approximately parallel to each other or linearly across the attachment point, extending from approximately opposite sides of the attachment point. Approximately parallel or linear includes linear and a small deviation therefrom to accommodate different locking schemes as described herein. Parallel or linear configuration of the hinge may therefore include a hinge in its open position even if not exactly straight and close to or at its fully open configuration. The attachment point may be an integral attachment, may be a coupling between two separate portions of the hinge, may be a removable attachment such that separate first and second portions of the hinge may be coupled or decoupled, and combinations thereof.

Exemplary embodiments of the hinge may include one or more stops. A stop may prevent the first portion from moving further in a given direction relative to the second portion. For example, the first portion and second portion each include first contact surfaces such that the first contact surfaces touch in the closed configuration, thus acting as a stop for further rotation in a first relative direction. The first portion and second portion may each include a second contact surface such that the second contact surfaces touch in the open configuration, thus acting as a stop for further rotation in a second relative direction different from the first direction. A stop may also include a surface, projection, mated surface, or other mechanism to prevent the first portion from further movement relative to the second portion. The first surface and second surface may be positions such that the first stop positions the first and second portion in the closed position and the second stop positions the first and second portion in the open position. For example, the first portion and second portion may have facing surfaces that contact in a closed position and end surfaces that contact in an open position, where the facing surfaces is approximately perpendicular to the end surface on the respective first or second portion.

Exemplary embodiments may be configured such that the hinge retains the container in the one or more configurations. The hinge may therefore include a locking mechanism to retain the hinge is a specific relative configuration. In an exemplary embodiment, the locking mechanism retains the hinge in an open configuration, such that the locking mechanism may comprise a retention interface. As shown herein, the locking mechanism may work alone or in conjunction with one or more stops to retain the container in a given configuration. A locking mechanism may include a flexible and/or stretchable band attached between the first portion and second portion of the hinge. The locking mechanism may include mated structures that contact and couple, such as through frictional engagement (for example, a snap), hook and loop fastener, slide, or other mechanism.

In an exemplary embodiment, the container and hinge are configured such that when the hinge is locked in a configuration, the container is stable in the configuration. For example, when the hinge is locked in an open configuration, the container is maintained and static in an open configuration for easy filling and access to the interior of the container.

Aspects of the present disclosure may include a hinge.

In an aspect of the present disclosure, a container may include one or more hinges. The container may be configured to remain stable in more than one configuration. For example, the container may be in a folded configuration, wherein the container may be substantially flat and the hinges may be in a closed configuration. As an example, the container may be in an unfolded configuration, wherein the container may be substantially unfolded and the hinges may be in an open configuration. In the unfolded configuration, one or more walls of the container may remain substantially upright.

In an exemplary embodiment, the one or more hinges may be living hinges.

In an exemplary embodiment, the hinge may be a single piece. In an aspect of the present disclosure, the hinge may be more than one piece.

In an exemplary embodiment, the hinge may include material such as, but not limited to, polypropylene, plastic, and/or any combination thereof.

In an exemplary embodiment, the container may include one or more pockets. The one or more hinges may be positioned within an interior cavity defined by the one or more pockets. One or more hinges may be within the same pocket. Each hinge may be positioned within a separate pocket.

In an exemplary embodiment, the hinges may be coupled to the container by a coupling mechanism such as, but not limited to, an adhesive, a rivet, one or more snaps, one or more stitches, one or more fasteners, bonding, other known attachment methods, and/or any combination thereof.

In an exemplary embodiment, the container may be a bag. The bag may include a first wall, a second wall, a first hinge and a second hinge. The first wall may be located opposite the second wall, such that the first wall substantially faces the second wall. The first hinge may be located on an upper portion of the first wall of the bag. The second hinge may be located on an upper portion of a second wall of the bag.

The first and second walls may be substantially flexible. The first and second hinges may stiffen the first and second walls such that the first and second walls may remain substantially upright when the first and second hinges are in the unfolded configuration.

FIGS. 1A-1D illustrate an exemplary embodiment of a hinge according to embodiments described herein in different configurations. Exemplary embodiments of the hinge may be incorporated into a container for holding and retaining objects. In an exemplary embodiment, the container may be flexible, and the hinge may be used to retain the container, or a portion thereof, in at desired position.

Figure 1B:
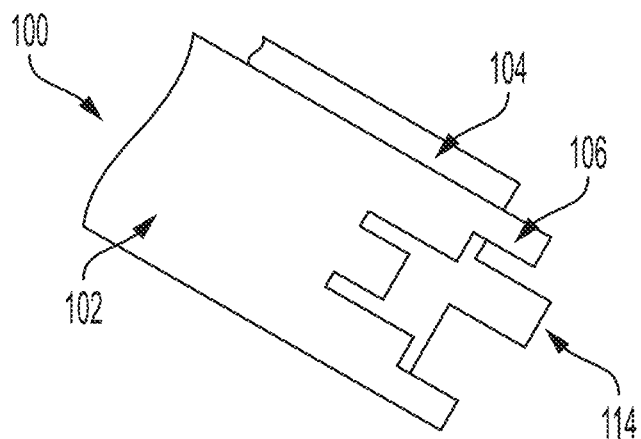
Figure 1C:
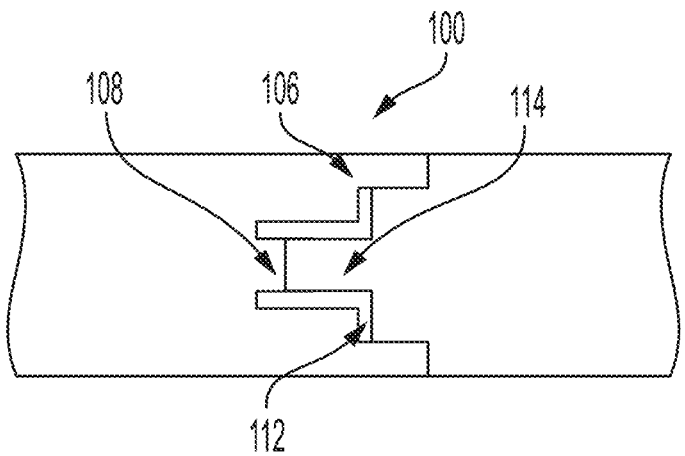

As shown in FIGS. 1A-1C, a hinge 100 may include a hinge body 101 having a first portion 102 and second portion 104. FIG. 1A illustrates the component parts of the exemplary hinge 100, while FIG. 1B illustrates the hinge in a collapsed configuration and FIG. 1C illustrates the hinge in an expanded configuration. In an exemplary embodiment the expanded configuration is a locked configuration. As illustrated, the first portion 102 and second portion 104 may be separate component parts. The first portion 102 and second portion 104 may also be integrated and/or attached to form a single component part. As illustrated by a comparison between FIG. 1B and FIG. 1C, the first portion 102 and second portion 104 of the hinge 100 may move relative to each other in a first configuration and may be statically oriented or locked relative to each other in a second configuration. As illustrated, the second configuration includes a direct attachment and/or contact between the first portion 102 and the second portion 104.

As illustrated, the first portion 102 includes a body in which a plurality of projections extend from a terminal end thereof. As illustrated, three projections are provided. A pair of exterior projections 106 are positioned on opposing sides of a central projection 108. As illustrated, a gap 110 may be formed between adjacent projections. However, the projections may be positioned proximate adjacent projections with or without a gap therebetween.

As illustrated, the second portion 104 includes a body in which one or more projections extend from a terminal end thereof. As illustrated, one projection is provided. However, any combination of projections may be used. The terminal end of the second portion 104 includes a surface 112 at a terminal end of the body in which projection 114 extends therefrom.

As seen from a comparison between FIGS. 1B and 1C, the first portion 102 and second portion 104 of the hinge 100 both include an interface for retaining the relative positions of the first portion 102 and the second portion 104 such that a desired position of the hinge is static when engaged. In an exemplary embodiment, the retention interface includes the coupling of the projections from each portion. As seen in FIG. 1C the projections 106 of the first portion 102 are positioned on one side of the second portion 104, while the projection 114 of the first portion 102 is positioned on a second side of the second portion 104, where the one side and the second side are opposite sides of the second portion. The projection 114 of the second side 104 extends past and overlaps along a length of the projection 108.

In an exemplary embodiment, the hinge may transition from a collapsed configuration (such as illustrated in FIG. 1B) to an extended configuration (such as illustrated in FIG. 1C), by rotating the first portion 102 of the hinge 100 relative to the second portion 104 of the hinge 100. The first portion 102 and the second portion 104 may engage to a locked position by longitudinally inserting the portions together or in a continued rotation of the first portion relative to the second portion. For example, once positioned generally linearly, with the projections of respective portions positioned adjacent each other. The first portion may be rotated relative to the second portion about a rotational axis such that at least one projection of either the first portion or the second portion bends to move past the other portion. Therefore, at least one projection from either the first portion or the second portion ends up on an opposite side of the second portion or the first portion.

Figure 2:
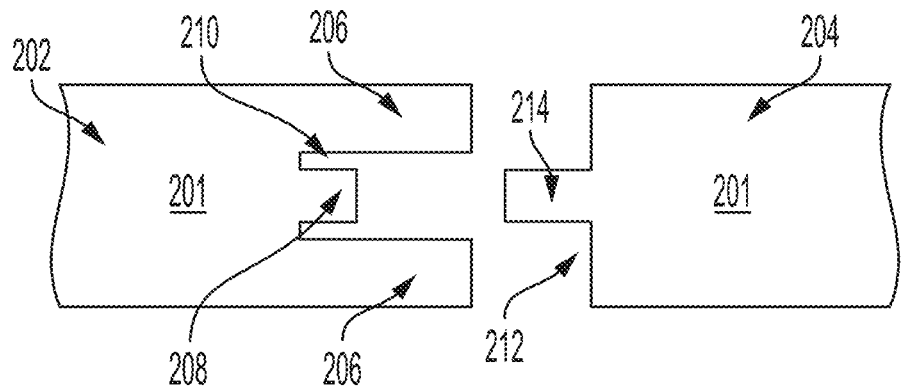
FIG. 2 illustrates an exemplary embodiment of a cut away of a hinge according to embodiments described herein.
Figure 3:
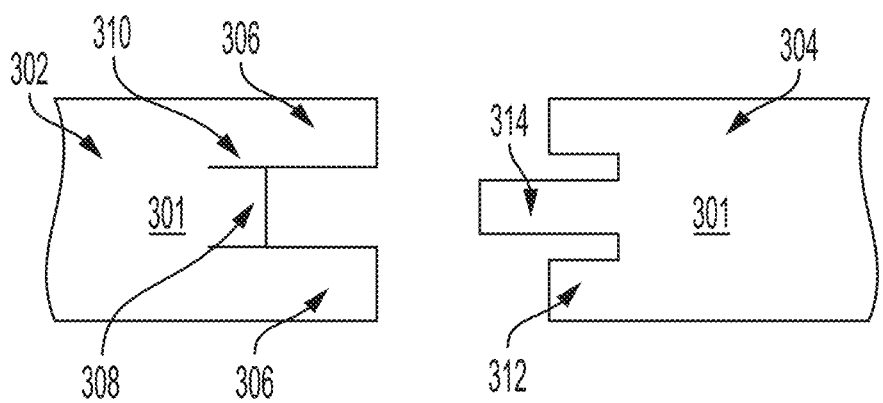
FIG. 3 illustrates an exemplary embodiment of a cut away of a hinge according to embodiments described herein.

Exemplary embodiments include different combinations of projections and/or retention interfaces. FIG. 2 illustrates an exemplary embodiment including a retention interface. FIG. 3 illustrates an exemplary embodiment including a retention interface. As illustrated, different configurations of the hinge with the retention interface may be used and remain within the scope of the present disclosure. Any combination of retention interfaces and/or in other configurations are also considered within the scope of the instant disclosure.

As seen from a comparison between FIGS. 1A and 2, the projections 208, 206, and/or 214 may define different exterior shapes. The shape in profile, cross section, thickness, or other dimension may be used to facilitate the flexibility of a projection relative to one or more other projections. For example, one or more projections may be thicker in one or more dimensions to reduce flexibility of the projection relative to one or more other projections. As the first portion and second portion are engaged, one or more projections may be more rigid and experience greater deformation such that their relative position is maintained, while one or more other projections may be more flexibility and deform to facilitate their deflection and the movement of projection past another projection or surface. The thickness may be tapered or step wise varied along a length or may be constant along a projection.

As seen from a comparison between FIGS. 2 and 3, different combinations of projections and/or surfaces may be used to facilitate the retention of one portion to another portion. As illustrated, the retention surface 212 of FIG. 2 is formed into additional projections 312 extending from the body 301. The relative lengths, thicknesses, sizes, and shapes may be used to tailor the configuration and/or orientation of one projection relative to another as the first portion and second portion move relative to each other and transition from the collapsed configuration to the expanded configuration.

FIG. 2 illustrates an exemplary hinge having a body 201, and a first portion 202 and second portion 204. The first portion 202 includes a plurality of protections from terminal end thereof positioned adjacent each other. As illustrated, a projection may include a gap 210. The plurality of projections may be of different lengths, thicknesses, sizes, shapes, and a combination thereof. For example, a pair of exterior projections 206 may be on opposing sides of an interior projection 208. The interior projection 208 may be of a similar width as the exterior projections 206, but may be thicker (into the page) and shorter (in plane along a longitudinal length) than the exterior projections. The second portion 204 may include a projection 214 extending from a terminal end of the body 201 of the second portion 204. The terminal end of the body 201 outside of the projection may define a contact surface 212. The contact surface may engage exterior projections 206 of the first portion, while the projection 214 of the second portion 204 engages projection 208 of the first portion 202.

FIG. 3 illustrates an exemplary hinge having a body 301, and a first portion 302 and second portion 304. The first portion 302 includes a plurality of protections from terminal end thereof positioned adjacent each other. As illustrated, a slit 310 is provided between adjacent projections 306 and 308, and not a gap as provided in FIG. 2. In another embodiment, the slit is removed and only the exterior projections 306 are provided. In which case, the projection 314 of the second portion 304 would engage with a terminal end of the first portion 302 positioned between the exterior projections 306. The plurality of projections may be of different lengths, thicknesses, sizes, shapes, and a combination thereof. The second portion 304 may also include a plurality of projections 314, 312 extending from a terminal end of the body 301 of the second portion 304. Respective exterior projections, 306, 312 therefore engage each other while central projections 308, 314 engage each other.

Figure 4A:
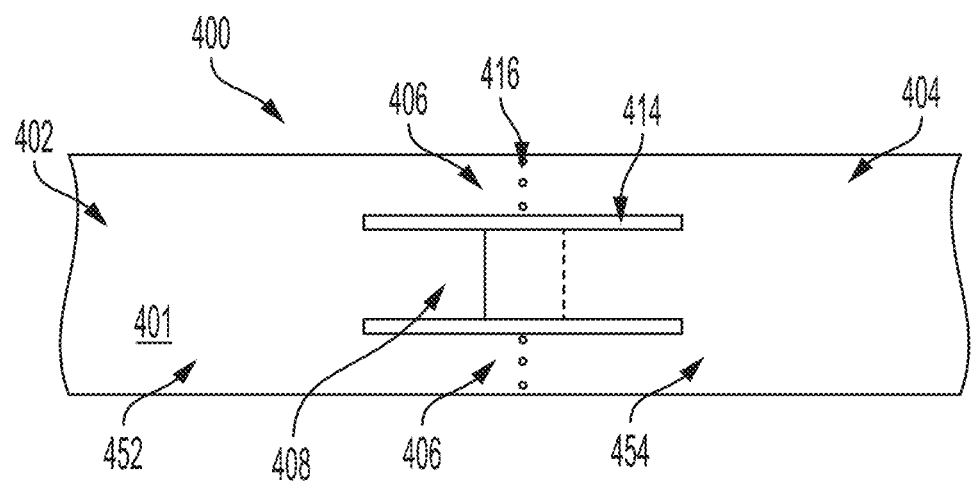
FIGS. 4A-4B illustrate an exemplary embodiment of a cut away of a hinge according to embodiments described herein.
Figure 4B:
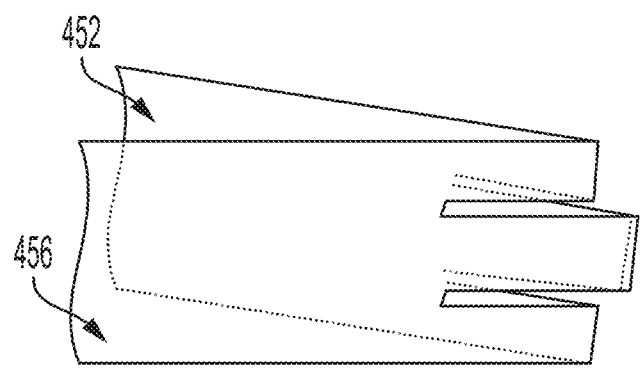

FIGS. 4A-4B illustrate an exemplary hinge 400 according to embodiments described herein. Similar to FIGS. 1-3, the exemplary hinge includes a retention interface to retaining the hinge in an expanded configuration. In the embodiment of FIGS. 4A-4B, the exterior projections 406 extend across and are integral between the first portion 402 and second portion 404, such that the hinge makes a unitary body 401. The projections 406 include an axis of rotation 416 or a pivot line in which the first portion 402 moves relative to the second portion 404. The axis of rotation 416 may be defined by a living hinge, indentation, crease, bend, or other coupling between the projections 406 of the respective first portion 402 and second portion 404.

Similar to FIGS. 2-3, the hinge of FIG. 4A may include a mated pair on projections as a retention interface. As suggested by FIG. 4B, the hinge may include a collapsed configuration. In the collapsed configuration, the first portion 402 and second portion 404 are positioned adjacent one another along the respective lengths thereof. The first portion 402 and second portion 404 may therefore overlap, and the first portion 402, including its projection 408, are on the same side of the second portion, including its projection 414. The first portion 402 may rotate about the axis 416 relative to the second portion 404 to an extended position. To retain the relative positions of the first portion to the second portion in an extended configuration, the projections may move past each other. For example, the first portion 402 includes a first side 452 and a second side (not shown) and the second portion 404 includes a first side 454 and a second side 456. The first and second sides may be generally planar, flat, parallel, and/or opposite sides of each portion. In the expanded configuration, the first sides 452, 454 are on the same side of the hinge and the second sides 456 are on the same side of the hinge and opposite the first sides. In the collapsed configuration, the first sides are on an interior of the hinge and positioned adjacent and proximate each other, while the second sides of the portions are on an exterior side of the hinge. In an exemplary embodiment, the projection 408 of the first side 452 is on a first side 454 of the second portion 404 in the collapsed configuration, and the projection 408 of the first side 452 is on the first side 454 of the second portion 404 as the first portion is rotated relative to the second portion to the expanded configuration. In order to retain the first portion relative to the second portion and the hinge in the expanded configuration, the projection 408 is moved to the second side 456 of the second portion 404 and contact the projection 414 of the second portion 404.

Figure 5:
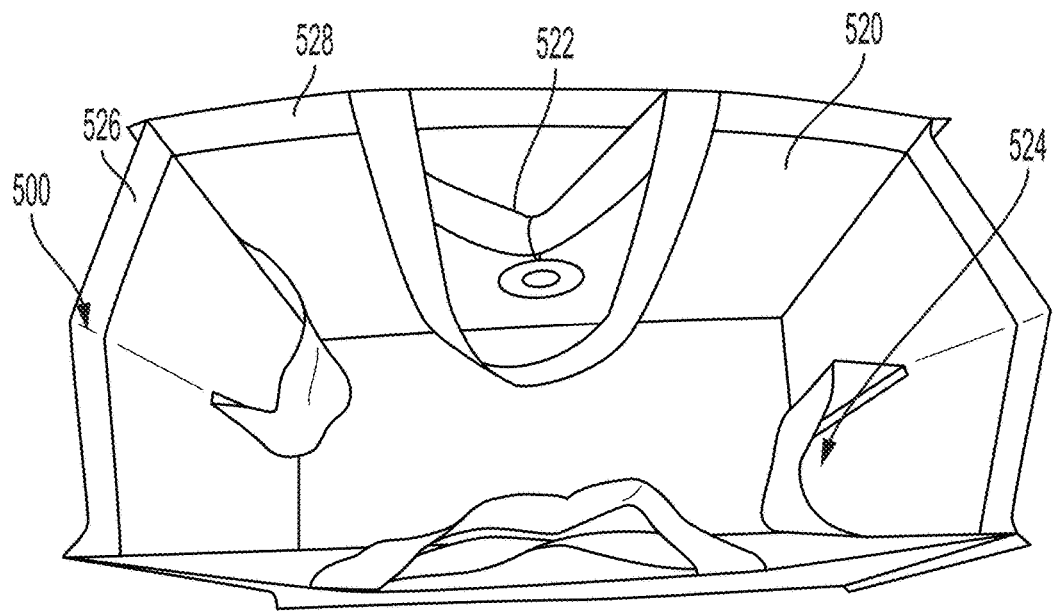
FIG. 5 illustrates a top elevation view of a bag having a hinge according to embodiments described herein.

FIG. 5 illustrates a top elevation view of a container according to embodiments described herein. The container 520 includes a hinge 500 according to embodiments described herein. The container may include handle 522, pockets 524, and other attributes of a carrying container. As illustrated, the container may include a plurality of pockets and/or sleeves positioned adjacent an interior surface of the container. The pockets and/or sleeves may be shaped and positioned to retain desired objects within the container. For example, the pockets and/or sleeves may be sized to hold a cylindrical object of a desired diameter. The container may be configured as a bag, and the pockets configured to retain wine bottles or other conventionally sized bottles or objects.

In an exemplary embodiment, the container includes a bag. The container may be of a flexible material. The container may be configured to collapsed to a reduced configuration having a smaller one or more dimensions and/or volume. The container may be configured to expand to a larger configuration. In the expanded configuration, the container may permit access to an interior of the container. For example, the bag may include an opening that provides access to an interior of the bag. The opening may be in an open shape to provide the largest area to access the interior in the expanded configuration of the container, and closed in the collapsed configuration.

In an exemplary embodiment, the container is in a cubic shape having five sides. Each of the five sides may define a surface. Any combination of surfaces or edges between surfaces may flex to permit the container to fold to the collapsed configuration. As illustrated, lateral opposing sides of the container may each include a fold line along a length of the container side. The fold line permits the side of the container to bend along the fold line. In an exemplary embodiment, one or more embodiments of the hinge traverse the side and extend across the fold line. The hinge may be configured to permit the container to flex about the fold line in a first position and limit the amount the container can flex about the fold line in a second position. For example, the hinge may include a lock, such as exemplary retention interfaces described herein, to reduce the relative movement of the first portion relative to the second portion.

As illustrated in FIG. 5, the container may include an opening to permit access to an interior of the container. The opening may be defined by an edge. As illustrated, the edge of the opening is the perimeter of the open side of the container. Positioned at or adjacent the edge of the opening may be one or more hinges according to embodiments described herein. The edge may include one or more boarders that define a passage. The one or more hinges may be positioned within the one or more passages. As illustrated, a terminal end of the container proximate the opening includes a folded over section that creates an internal passage. A hinge according to embodiments described herein are positioned within the passage 526 on opposing sides of the container on opposite sides of the opening. The intermediate sides between the opposing sides of the container may include additional hinges, or may include a reinforcement to retain a desired shape of the side within another passage 528. The passages 526, 528 may traverse and entire length of a respective side or may extend a portion of the length of a side.

In an exemplary embodiment, the container and/or hinge may include a biased configuration toward the collapsed or expanded configuration. For example, the hinge may include a remembered state in which the hinge is at least partially bent and not in a fully extended, or approximately linear configuration. The remembered state may impose a biasing force against the hinge in the extended configuration toward the collapsed configuration. The biasing force may provide frictional engagement between the retention interfaces. The biased configuration may also be created by a flexible and/or elastic component or band.

Figure 6A:
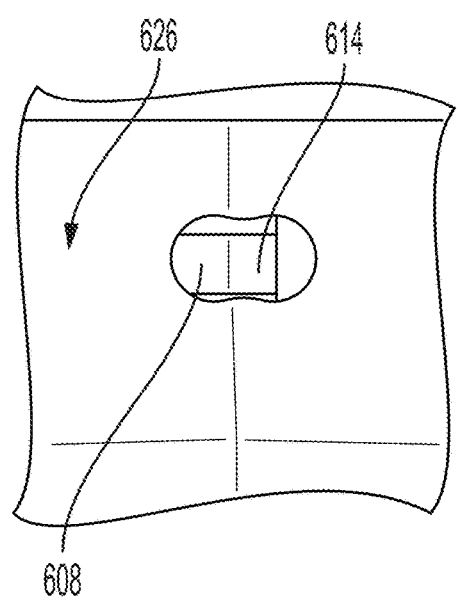
FIGS. 6A-6B illustrate an exemplary cut away of the bag of FIG. 5 in a closed or extended and an open or partially collapsed configuration of the hinge, respectively.
Figure 6B:
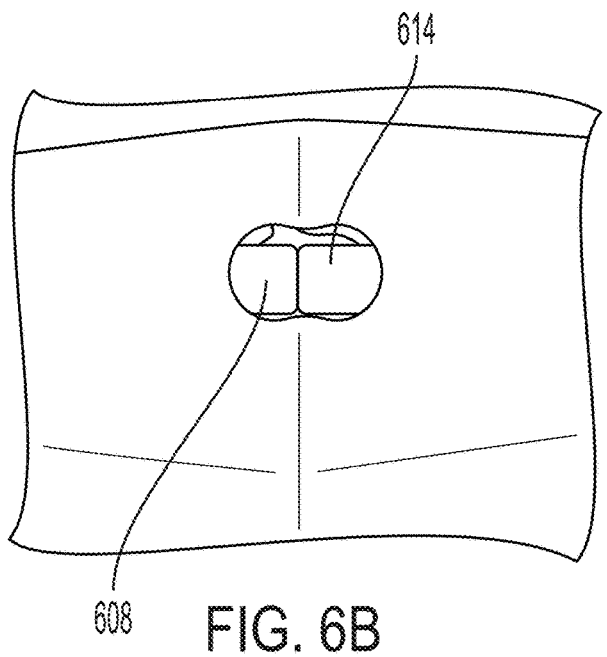

FIGS. 6A-6B illustrate a partial view of the bag of FIG. 5 at the hinge. As illustrated the retention interface of an exemplary hinge include extensions 608, 614. The hinge is within a passage 626 of the container. As illustrated, the passage may include an opening such that the retention interface is visible to a user. The opening may permit a user to visually inspect the position of the retention interface and/or any additional locking mechanism to ensure the container is in desired configuration. The opening may also permit access to the hinge to assist in manipulating the hinge between desired configurations.

Exemplary embodiments may be configured such that the hinge retains the container in the one or more configurations. The hinge may therefore include a locking mechanism to retain the hinge is a specific relative configuration. In an exemplary embodiment, the locking mechanism retains the hinge in an open configuration, such that the locking mechanism may comprise a retention interface. As shown herein, the locking mechanism may work alone or in conjunction with one or more stops to retain the container in a given configuration. A locking mechanism may include a flexible and/or stretchable band attached between the first portion and second portion of the hinge (see, e.g. FIGS. 7A-7B, 9A-9E, 10, 11). The locking mechanism may include mated structures that contact and couple, such as through frictional engagement (for example, a snap, see, e.g. FIG. 7A, FIGS. 8A-8B, 13-14, 15A-15D, 16A-16B), hook and loop fastener (see, e g. FIG. 12), slide (see, e.g. FIG. 17), other mechanism, or any combination thereof.

Figure 7A:
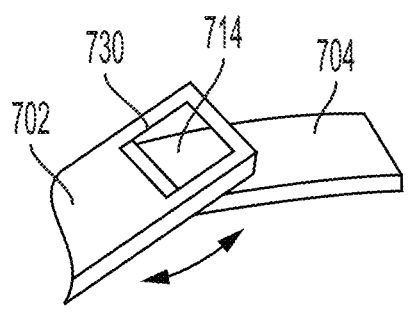
FIGS. 7A-7B illustrate an exemplary embodiment of a cut away of a hinge according to embodiments described herein.
Figure 7B:
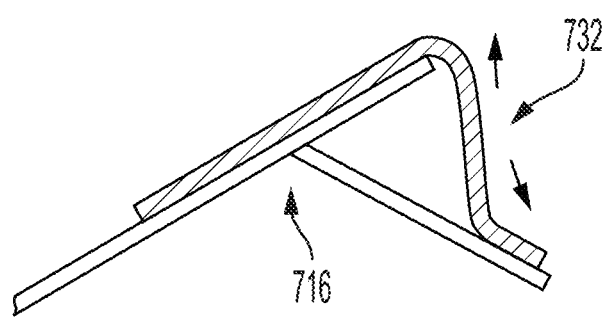

FIGS. 7A-7B illustrate an exemplary embodiment of a cut away of a hinge according to embodiments described herein. As illustrated, the hinge includes a first portion 702 and a second portion 704. The first portion 702 and second portion 704 may be integrally connected to form a unitary body or may be separable. If unitary, the hinge may include an axis of rotation between the first portion 702 and the second portion. The hinge may also include a retention interface. The retention interface may include an extension 714 at an end of the second portion 704 that hits a stop defined by a terminal end of the first portion 702. For example, the first portion 702 includes an aperture proximate a terminal end of the first portion. The extension 714 of the second portion 704 fits within the aperture to permit the second portion to rotate relative to the first portion and linearly align with each other. The terminal end defining a portion of the aperture acts as a stop against the second portion to limit rotation past the stop. The interface between the extension 714 and aperture 730 may act as a lock to retain the hinge in the extended or closed configuration. For example, the extension 714 may frictionally engage the aperture 730 or the contacting surfaces between the extension 714 and aperture 730 may be contoured to mate. Exemplary embodiments may also or alternatively include an extendable member 732 to bias the hinge in a given configuration. As illustrated, the band extends from the first portion to the second portion and stretches when the hinge is in the folded or collapsed configuration.

Figure 8A:
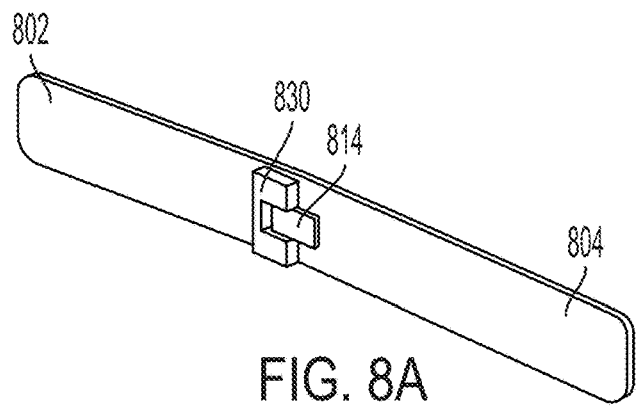
FIGS. 8A-8B illustrate an exemplary embodiment of a hinge according to embodiments described herein.
Figure 8B:
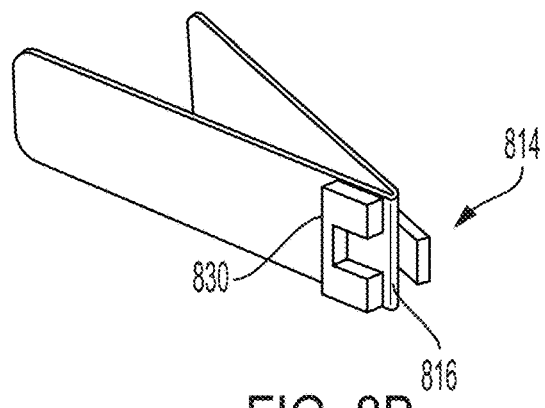
Figure 8C:
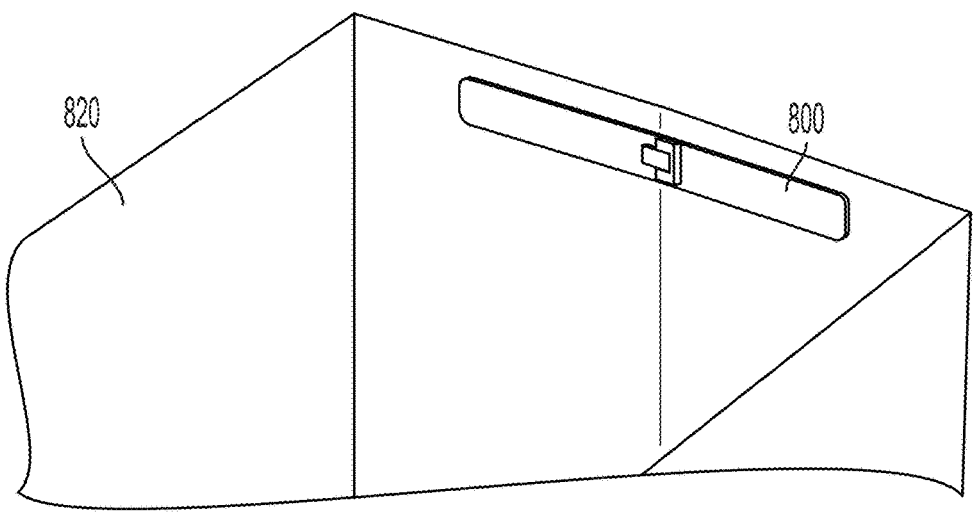
FIG. 8C illustrates an exemplary cut away of a bag according to embodiments described herein including a hinge.

FIGS. 8A-8B illustrate an exemplary embodiment of a hinge according to embodiments described herein. FIG. 8C illustrates an exemplary cut away of a bag 820 according to embodiments described herein including a hinge. The exemplary hinge includes a first portion 802 and second portion 804 that rotate relative to each other. As illustrated, the first portion 802 and second portion 804 are integrally formed to define a unitary body. The body includes an axis of rotation permitting the relative rotation of the first portion 802 to the second portion 804. The hinge includes a retention interface. The retention interface includes an extension 814 from an end of the second portion 804 that overlaps a portion of the first portion 802 in the extended configuration. The extension 814 mates with a mating surface on the first portion 802. As illustrated the mating surface 830 includes an aperture 830 that fits the extension 814. The aperture may be sides to retain the extension in the extended configuration. For example, the aperture may include a cross dimension that is smaller than a corresponding cross dimension of the extension. The cross dimension may be in a length of width direction of the extension such that at least a portion if the extension is positioned between the surface defining a perimeter of the aperture (e.g. a lip) and the first portion 802. The retention interface may act as a snap or frictionally engaged mated surfaces to retain the hinge in the extended configuration.

Figure 9A:
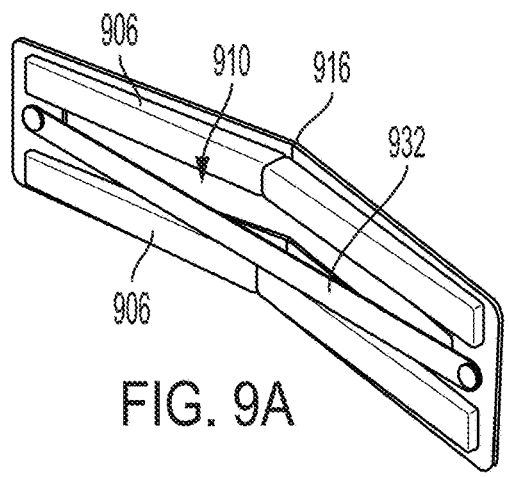
FIGS. 9A-9D illustrate an exemplary embodiment of a hinge according to embodiments described herein.
Figure 9B:
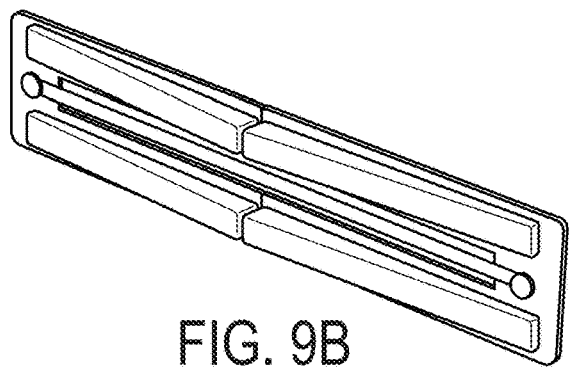
Figure 9C:
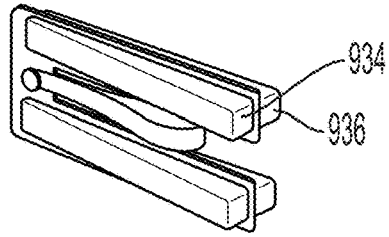
Figure 9D:
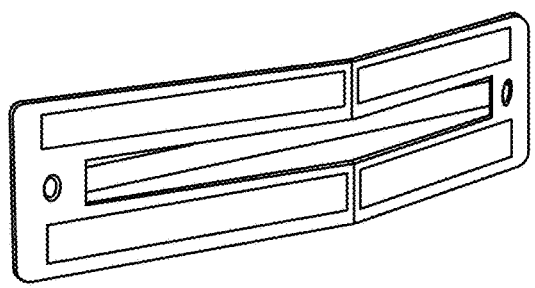
Figure 9E:
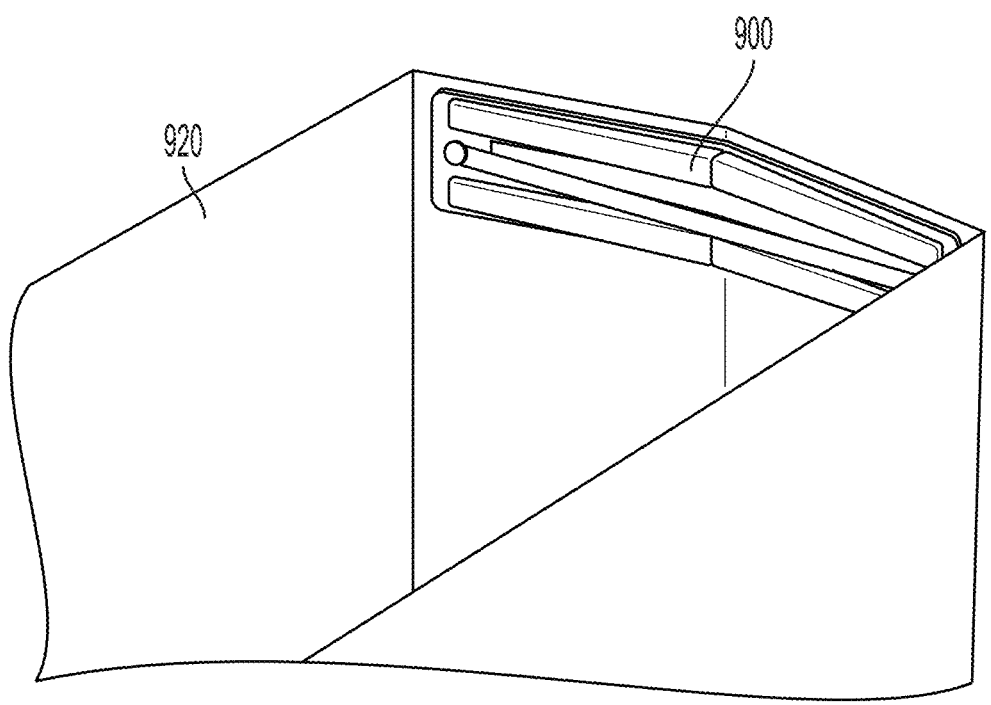
FIG. 9E illustrates an exemplary cut away of a bag according to embodiments described herein including a hinge.

FIGS. 9A-9D illustrate an exemplary embodiment of a hinge according to embodiments described herein. FIG. 9E illustrates an exemplary cut away of a bag 920 according to embodiments described herein including a hinge. The exemplary hinge includes a first portion and second portion that rotate relative to each other. As illustrated, the first portion and second portion are integrally formed to define a unitary body. The body includes an axis of rotation 916 permitting the relative rotation of the first portion to the second portion. The hinge includes a retention interface. The first portion and second portion, each includes two extensions 906 defining a gap 910 there between. The respective extensions of each portion contact to form the axis of rotation. The extension of the first portion includes a stop 934 and the extension of the second portion includes an end stop 936 that contact each other when the hinge is in the extended configuration. The retention interface includes the respective end stops 934, 936. The retention interface may also include an extendable member 932. The bias imposed by the extendable member and the limits of relative rotation of the first portion and the second portion created by the contact between the respective end stops may be used to retain the hinge in the extended configuration. As illustrated, when the hinge is in the bent configuration, the extendable member may be positioned in the gap between the extensions of the first portion and the second portion.

Figure 10:
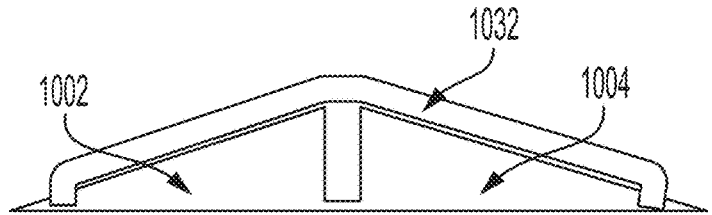
FIGS. 10-14 illustrate exemplary embodiments of a hinge according to embodiments described herein.
Figure 11:
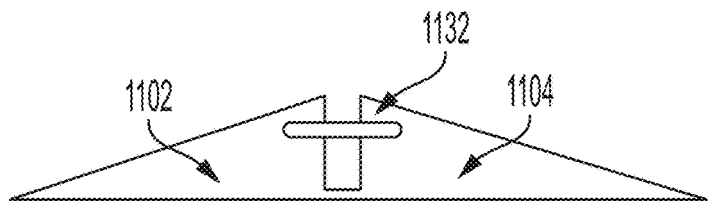
Figure 12:
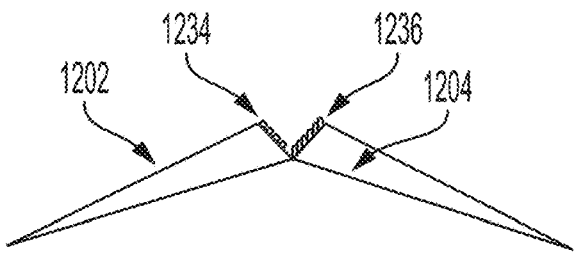
Figure 13:
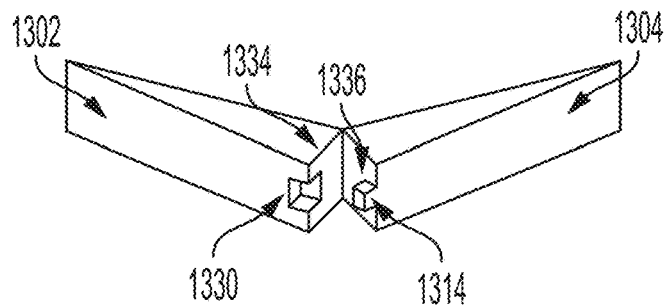
Figure 14:
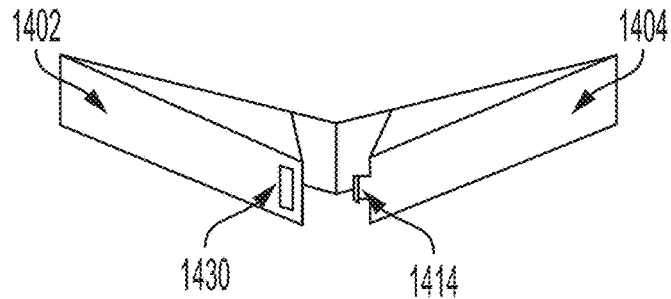
Figure 15A:
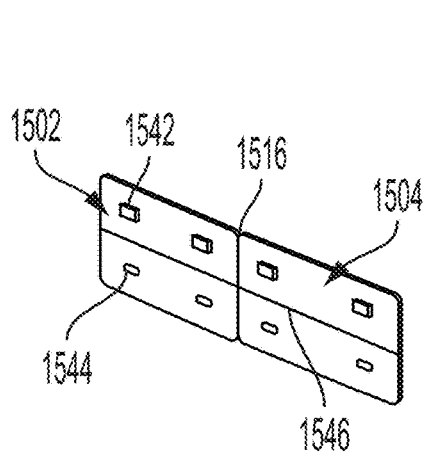
FIGS. 15A-15D illustrate exemplary embodiments of a hinge and cut away portions of a bag having a hinge according to embodiments described herein.
Figure 15B:
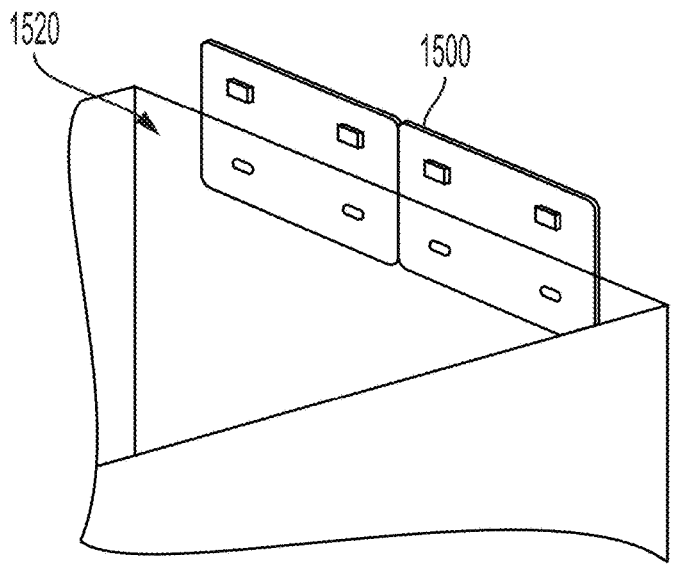
Figure 15C:
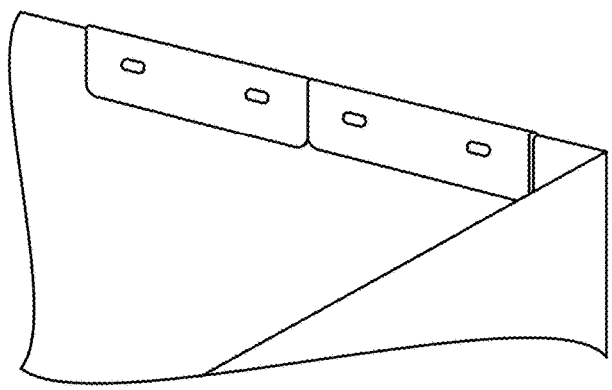
Figure 15D:
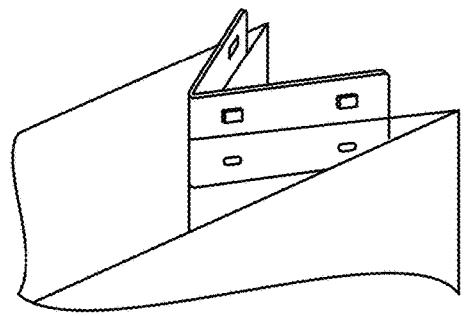

FIGS. 10-14 illustrate exemplary embodiments of a hinge according to embodiments described herein. FIGS. 10-14 include embodiments of a hinge similar to that described in FIGS. FIGS. 9A-9D, and have a first portion 1002, 1102, 1202, 1302, 1402 and second portion 1004, 1104, 1204, 1304, 1404 and corresponding end stops on each of the portions. FIGS. 10-11 illustrate exemplary configurations of an elastic member 1032, 1132 extending between the first portion and the second portion. The elastic member is coupled between the first portion and the second portion and configured to impose a bias on the hinge to retain the first portion relative to the second portion is a desired configuration. As illustrated the elastic member and the end stops work together as a retention interface, wherein the end stops limit relative rotation of the portions relative to each other in a first direction and the elastic member imposes a biasing force against the relative rotation of the portions relative to each other in a second direction opposite the first direction. FIGS. 12-14 illustrate exemplary retention interfaces that may be included. For example, end stop 1234 and 1236 may include mated hook and loop fasteners or other connector to removably attach the respective surfaces together. Other removable fasteners may also be used such as an adhesive, snaps, mated surfaces, frictional engagements, etc. FIGS. 13-14 illustrate exemplary frictional engagements. For example end stop 1334 may include an aperture 1330, 1430 or recess and end stop 1336 or second portion 1304, 1404 may include an extension 1314, 1414 that fits within aperture 1330, 1430. The extension and aperture may define a mated surface such that they frictionally engage. The extension and/or aperture may also include a lip or other projection to also engage.

FIGS. 15A-15D illustrate exemplary embodiments of a hinge and cut away portions of a bag having a hinge according to embodiments described herein. The exemplary hinge includes a first portion 1502 and second portion 1504 that rotate relative to each other. As illustrated, the first portion and second portion are integrally formed to define a unitary body. The body includes an axis of rotation 1516 permitting the relative rotation of the first portion to the second portion. The hinge includes a retention interface. The retention interface includes a frictional interface similar to other embodiments described herein. The retention interface may include an extension 1542 and aperture 1544 that matingly engage to couple the interface together. In this case, the retention interface that contact and retain the hinge in a desired configuration are on the same portion of the hinge. For example, an aperture 1544 and extension 1542 are on the same first portion 1502 of the hinge. The hinge includes a second axis of rotation 1546 such that portions of the first portion are able to rotate or move relative to other portions of the first portion. Essentially, the hinge is permitted to fold about a first axis of rotation, and fold separately around a second axis of rotation. The first axis of rotation may be perpendicular to a second axis of rotation.

Figure 16A:
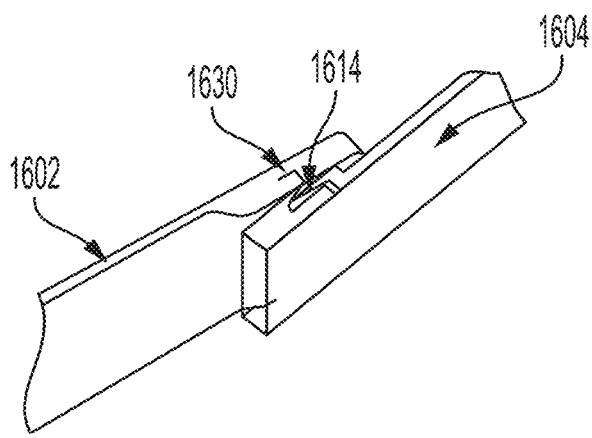
FIGS. 16A-16B illustrate, in a cut away perspective view and cross sectional view, an exemplary embodiment of a hinge according to embodiments described herein.
Figure 16B:
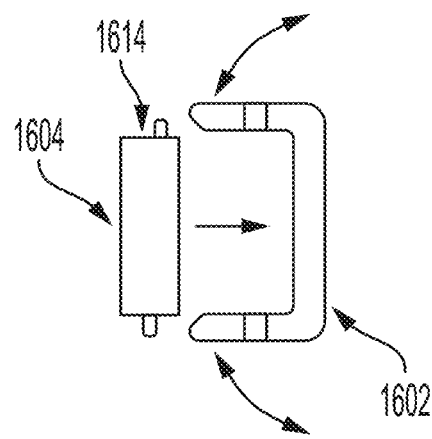

FIGS. 16A-16B illustrate, in a cut away perspective view and cross sectional view, an exemplary embodiment of a hinge according to embodiments described herein. The exemplary hinge includes a first portion 1602 and second portion 1604 that rotate or move relative to each other. As illustrated, the first portion and second portion are separately formed to define a attachable bodies. The hinge includes a retention interface. The exemplary retention interface includes a frictional engagement similar to other embodiments described herein. The retention interface includes an aperture 1630 and extension 1614 that engage. As illustrated, the aperture 1630 is on a projection or lip of the first portion. The second portion 1604 is therefore retained within or between portions of the first portion 1602. The aperture 1630 may also include indentations in which the extension 1614 fits within, such as an indent, detent mated interface.

Figure 17:
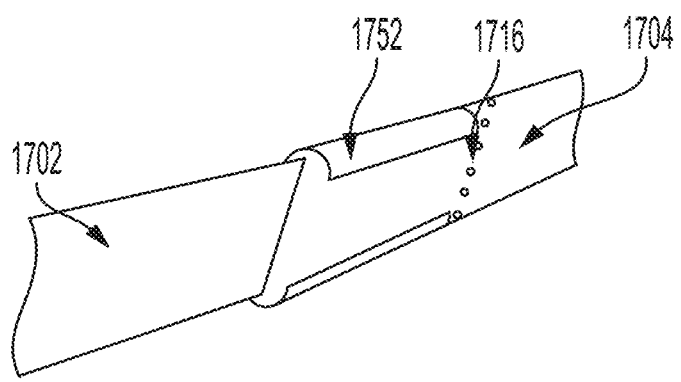
FIG. 17 illustrates a cut away perspective view of a hinge according to embodiments described herein.

FIG. 17 illustrates a cut away perspective view of a hinge according to embodiments described herein. The exemplary hinge includes a first portion and second portion that rotate or move relative to each other. As illustrated, the first portion and second portion are separately formed to define a attachable bodies. The hinge includes a retention interface. Similar to the retention interface of FIGS. 16A-16B, the retention interface of FIG. 17 retains a portion of one portion within the other portion. As illustrated, the second portion includes an extension 1752 including a lip that extends about at least two sides of the first portion 1702. A pair of extensions on the second portion therefore retain the first portion therein. The retention interface may therefore simply include the slide attachment of one portion to the other portion. The first portion may therefore move relative to the second portion may removing the respective portions from the retention interface and move the portion out of contact of each other. The first portion and/or second portion may also include an axis of rotation 1716 that permits the rotation of one portion relative to the second portion. The first portion and second portion may therefore remain coupled within the slide of the other. The retention interface retains the relative position of the first portion to the second portion by overlapping the first portion and second portion across the axis of rotation such that one portion contacts the other portion having the axis of rotation on both sides of the axis of rotation acting as a stop or limit against further rotation about the axis in at least one direction. The slide may create a limit against further rotation about the axis in another direction.

In an exemplary embodiment, the hinge may be substantially planar. The hinge may be substantially flat in a bent configuration. As such, the hinge may allow the container to lie approximately flat when the hinge is in the bent configuration. The hinge may be substantially linear, and/or flat in an extended configuration. The hinge in an extended configuration may correspond to a container in an open configuration.

In an exemplary embodiment, the bag may stand significantly upright when the bag is in the expanded or open configuration. The first and second walls may be substantially flexible. The first and second hinges may be positioned on the first and second walls, respectively, and may be configured to stiffen the first and second walls, such that the first and second walls may remain substantially upright when the first and second hinges are in the expanded configuration. The first wall may further include a first indentation that facilitates a folding of the first wall. A central portion of the first hinge may align with the first indentation. When the first hinge is in the open or expanded configuration, the first hinge may reduce or limit folding of the first wall. The second wall may further include a second indentation that facilitates a folding of the second wall. A central portion of the second hinge may align with the second indentation. When the second hinge is in the expanded configuration, the second hinge may limit the folding of the second wall. The central portion of the first and second hinge may define an axis of rotation or a location of relative movement between the first portion and the second portion of the hinge.

In an exemplary embodiment, a bag having hinges according to embodiments described herein may have a first configuration and a second configuration. The bag in a second configuration may lie substantially flat. The bag may be able to transition from the first configuration to the second configuration.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a view of the device as shown in the present disclosure. Of course, if the device is inverted, above becomes below, and vice versa. Additionally, if oriented sideways, above and below may refer to sides of a device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A container comprising:
a flexible container surface defining an interior cavity and an opening operable to provide access to the interior cavity;
a plurality of vertical fold lines and a plurality of horizontal fold lines operable to achieve a first folded configuration of the container and a second unfolded configuration of the container in response to folding or unfolding one or more of the plurality of fold lines wherein the first folded configuration is substantially flat;
a hinge comprising
a first end, a second end with a living hinge defining an axis of rotation between the first end and the second end coupled to an upper interior surface of the container so that the living hinge transects a first of the plurality of vertical fold lines positioned between a pair of the plurality of vertical fold lines along a portion of the opening of the flexible container,
a first portion having a pair of first portion parallel projections on a first side of the axis of rotation,
a first portion gap between the first portion parallel projections,
a first portion central projection positioned in the first portion gap between the first portion parallel projections,
a second portion having a pair of second portion parallel projections on a second side of the axis of rotation bendably connected to the first portion parallel projections,
a second portion gap between the second portion parallel projections, and
a second portion central projection positioned in the second portion gap between the second portion parallel projections,
wherein the first portion central projection and the second portion central projection frictionally engage to form a lockable pivot point adjacent the first vertical fold line wherein the hinge is operable to releasably secure the flexible container surface at the first vertical fold line in the unfolded configuration.

2. The container of claim 1, wherein the hinge permits bending about the first vertical fold line in a first direction and limits bending about the first vertical fold line in a second direction.

3. The container of claim 2, wherein the first portion of the hinge is able to rotate relative the second portion of the hinge.

4. The container of claim 3, wherein the first portion and the second portion each comprise an elongated body.

* * * * *